US012425763B2

(12) United States Patent
Wang et al.

(10) Patent No.: US 12,425,763 B2
(45) Date of Patent: Sep. 23, 2025

(54) SOUND FIELD CONTROL DEVICE AND FILTER DETERMINATION SYSTEM

(71) Applicant: HONDA MOTOR CO., LTD., Tokyo (JP)

(72) Inventors: Xun Wang, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 247 days.

(21) Appl. No.: 18/190,349

(22) Filed: Mar. 27, 2023

(65) Prior Publication Data

US 2023/0319457 A1 Oct. 5, 2023

(30) Foreign Application Priority Data

Mar. 31, 2022 (JP) ................................. 2022-060492

(51) Int. Cl.
*H04R 1/22* (2006.01)
*H04R 3/12* (2006.01)

(52) U.S. Cl.
CPC ................. *H04R 1/22* (2013.01); *H04R 3/12* (2013.01); *H04R 2499/13* (2013.01)

(58) Field of Classification Search
CPC ........ H04R 1/22; H04R 3/12; H04R 2499/13; G10K 11/178; G10K 11/17833; G10K 11/17823; G10K 11/17854
USPC .................................................. 381/86, 71.4
See application file for complete search history.

(56) References Cited

U.S. PATENT DOCUMENTS 7,574,006 B2 * 8/2009 Funayama ....... G10K 11/17854 704/226
7,792,312 B2 * 9/2010 Inoue ............... G10K 11/17825 381/86
9,445,192 B2 * 9/2016 Ueno ............... G10K 11/17823
9,857,776 B2 * 1/2018 Watai ........................ G05B 5/01
11,749,250 B2 * 9/2023 Tani ................. G10K 11/17833 381/71.4
2015/0353007 A1 12/2015 Inoue et al.
2019/0299874 A1 * 10/2019 Iseki ................... B60R 11/0264

FOREIGN PATENT DOCUMENTS

JP 2015-229403 A 12/2015

* cited by examiner

*Primary Examiner* — Disler Paul
(74) *Attorney, Agent, or Firm* — Rankin, Hill & Clark LLP

(57) ABSTRACT

Provided is a sound field control device configured to produce a listening area where a travel sound effect is audible and a quiet area in a sound field in a vehicle using a plurality of speakers. The sound field control device includes: a periodic waveform generator configured to generate different phase two periodic waveforms related to the travel sound effect based on the vehicle speed, and a sound field controller configured to, for each of the plurality of speakers, individually amplify and combine the different phase two periodic waveforms to generate a combined result using an SAN filter having coefficients set for the speaker based on locations of the listening area and the quiet area and feed the combined result to the speaker.

9 Claims, 6 Drawing Sheets

FIG. 6

| | LISTENING AREA 2 | | | | |
|---|---|---|---|---|---|
| FREQUENCY f | Wr1 | Wi1 | ··· | WrM | WiM |
| 30[Hz] | 0.2 | 0.5 | ··· | 0.2 | 0.5 |
| 31[Hz] | −0.1 | 0.3 | ··· | −0.1 | 0.3 |
| ⋮ | ⋮ | ⋮ | ··· | ⋮ | ⋮ |
| 500[Hz] | 0.3 | 0.7 | ··· | 0.3 | 0.7 |

SOUND FIELD CONTROL DEVICE AND FILTER DETERMINATION SYSTEM

CROSS REFERENCE TO RELATED APPLICATIONS

The present application claims the foreign priority benefit under Title 35 U.S.C. § 119 of Japanese Patent Application No. 2022-060492, filed on Mar. 31, 2022, in the Japan Patent Office, the disclosure of which is herein incorporated by reference in its entirety.

BACKGROUND OF THE INVENTION

1. Field of the Invention

The present invention relates to a sound field control device configured to produce a listening area and a quiet area in a sound field and to a filter determination system configured to determine filters to be used in the sound field control device.

2. Description of Related Art

In recent years, efforts have been made to provide access to sustainable conveyance systems that consider vulnerable people such as elderly people and children among traffic participants. To achieve the aim, the efforts are focusing on research and development to further improve the safety and convenience of traffic through development related to improving the comfort of vehicles. To improve the comfort of vehicles, Japanese patent publication No. 2015-229403 (hereinafter referred to as Patent Literature 1) discloses a device that generates a travel sound effect based on the vehicle speed as a technique for generating a travel sound effect in an electric vehicle.

Regarding the comfort in the vehicle, according to the technique disclosed in Patent Literature 1, the travel sound effect will reach the occupants other than the driver in addition to the driver, which may cause discomfort in an occupant who is listening to music or at rest.

The present invention has been made in view of the above-described circumstances, and it is an object of the present invention to provide a sound field control device capable of producing a listening area where travel sound effect is audible and a quiet area with a small amount of computation and thus reducing the cost, which contributes to evolving sustainable conveyance system and to provide a filter determination system that determines the filters to be used in the sound field control device.

SUMMARY OF THE INVENTION

Provided by an embodiment according to the present invention is a sound field control device configured to produce a listening area where a travel sound effect is audible and a quiet area in a sound field in a vehicle using a plurality of speakers, the sound field control device including: a periodic waveform generator configured to generate different phase two periodic waveforms related to the travel sound effect based on the vehicle speed; and a sound field controller configured to, for each of the plurality of speakers, individually amplify and combine the different phase two periodic waveforms to generate a combined result using an SAN filter having coefficients, the coefficients being set with respect to the speaker based on locations of the listening area and the quiet area, and feed the combined result to the speaker.

Also provided by an embodiment according to the present invention is a filter determination system for setting the coefficients of the SAN filter of the sound field control device, the filter determination system including: at least one microphone used to pick up sounds generated by the plurality of speakers, at a plurality of positions in the sound field; and a filter determination device configured to determine the coefficients of the SAN filter based on a result of picking up the sounds by the at least one microphone so as to maximize a value obtained by dividing a value of sound energy in the listening area by a value of sound energy in the quiet area.

According to the invention, it is possible to produce a listening area where travel sound effect is audible and a quiet area with a small amount of computation and thus reduce the cost, which contributes to evolving sustainable conveyance system.

BRIEF DESCRIPTION OF THE DRAWINGS

FIG. 6 illustrates an example of a table that associates control target frequencies with filter coefficients.

DETAILED DESCRIPTION OF EMBODIMENT

Figure 1:
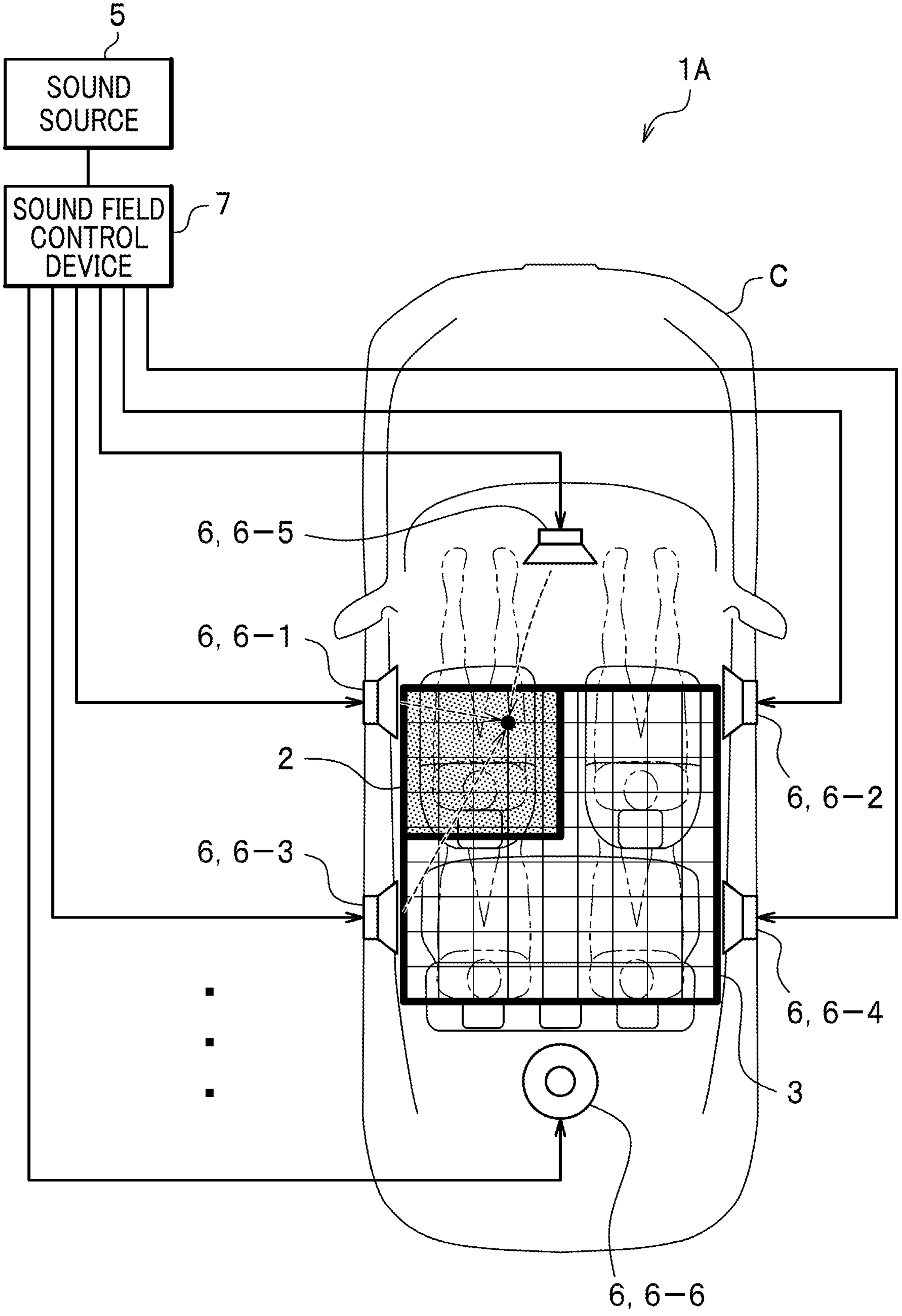
FIG. 1 is a schematic diagram of a vehicle to which a sound field control system and a filter determination system according to an embodiment of the invention have been applied.

Subsequently, an embodiment of the invention is described in detail by taking an example in which the invention is applied to a vehicle using a motor, rather than an engine (internal combustion engine), as the drive power source, with reference to the drawings as appropriate. Note that in the drawings, "front" and "rear" respectively represents forward and rearward directions i.e., vehicle front-rear directions, of the vehicle; and "left" and "right" respectively represents left and right directions (vehicle width directions) as seen from the driver's seat.

Sound Field Control System

As illustrated in FIG. 1, a sound field control system 1A according to an embodiment of the present invention produces a sound field in the vehicle compartment of a vehicle C, which sound field is divided into a listening area 2 where a vehicle travel sound (active sound effect) based on the vehicle speed (vehicle body speed) is audible and a quiet area 3 which is a counterpart of the listening area 2.

Listening Area

The listening area 2 is an area for providing a travel sound effect to an occupant (driver) located in the listening area 2. The listening area 2 is set to a location corresponding to the driver's seat of the vehicle C. The travel sound effect is an active sound effect based on the vehicle speed of the vehicle C. The purpose of the travel sound effect is to convey the feeling of speed of the vehicle C to the occupant (driver) listening to the travel sound effect, via the auditory sense of the occupant.

Quiet Area

The quiet area 3 is an area for not providing the travel sound effect to occupants located in the quiet area 3. The quiet area 3 is set at an area other than the listening area 2 in the vehicle compartment. In the present embodiment, the quiet area 3 is set at areas corresponding to the passenger seat and the rear seats.

Figure 2:
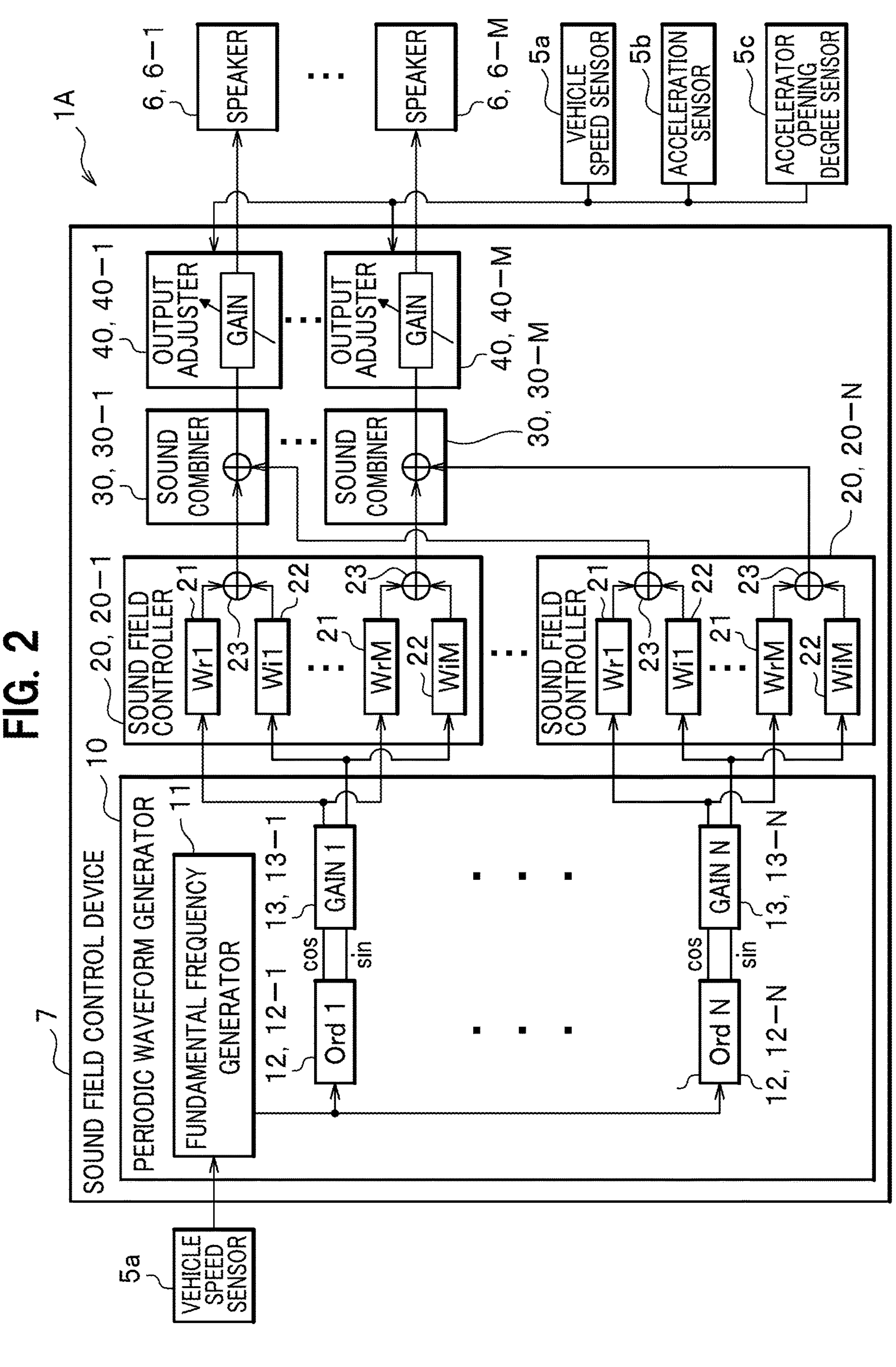
FIG. 2 is a schematic block diagram of the sound field control system according to the embodiment of the invention.

As illustrated in FIG. 2, the sound field control system 1A includes: a vehicle speed sensor 5*a*, an acceleration sensor 5*b*, an accelerator opening degree sensor 5*c*, a plurality of speakers 6 (6-1 to 6-M, where M=6 in the present embodiment), and a sound field control device 7.

Vehicle Speed Sensor, Acceleration Sensor, Accelerator Opening Degree Sensor

The vehicle speed sensor 5*a* detects the vehicle speed (vehicle body speed) of the vehicle C and feeds the detection result to the sound field control device 7. The acceleration sensor 5*b* detects the acceleration of the vehicle C and feeds the detection result to the sound field control device 7. The accelerator opening degree sensor 5*c* detects the opening degree of the accelerator pedal of the vehicle C and feeds the detection result to the sound field control device 7.

It should be noted that the vehicle speed and the acceleration to be referenced by the sound field control device 7 are not limited to the detection results of the above-described vehicle speed sensor 5*a* and the acceleration sensor 5*b*. For example, the sound field control device 7 may be configured to compute the vehicle speed based on a result of detection by a vehicle wheel speed sensor that detects the rotational speed (vehicle wheel speed) of a wheel of the vehicle C, or may be configured to compute the vehicle speed based on the rotational speed of a motor that rotates a vehicle wheel (driving wheel).

Speaker

In the present embodiment, the speaker 6-1 is provided on a side of the driver's seat; the speaker 6-2 is provided on a side of the passenger seat; the speaker 6-3 is provided on the left side of the rear seats; the speaker 6-4 is provided on the right side of the rear seats; the speaker 6-5 is provided on a front part of the vehicle compartment; and the speaker 6-6 is provided on a dash board of a rear part the vehicle compartment.

Sound Field Control Device

The sound field control device 7 generates, based on the vehicle speed of the vehicle C, sound signals for producing the listening area 2, where a travel sound effect based on the vehicle speed of the vehicle C is audible, and the quiet area 3, where the travel sound effect is inaudible, and feeds the generated sound signals to the speakers 6.

The sound field control device 7 is constructed of a Central Processing Unit (CPU), a Read-Only Memory (ROM), a Random Access Memory (RAM), and an input-output circuitry. The sound field control device 7 includes, as functional blocks, a periodic waveform generator 10, a plurality of sound field controllers 20 (20-1 to 20-N, where N=3 in this embodiment), a plurality of sound combiners 30 (30-1 to 30-M, where M=6 in the present embodiment), and a plurality of output adjusters 40 (40-1 to 40-M, where M=6 in the present embodiment).

Periodic Waveform Generator

The periodic waveform generator 10 generates, based on the vehicle speed, two periodic waveforms related to the travel sound effect and having different phases (cosine wave and sine wave in the present embodiment). The periodic waveform generator 10 includes, as functional blocks, a fundamental frequency generator 11, a plurality of harmonic acoustic frequency generators 12 (12-1 to 12-N, where N=3 in the present embodiment), and a plurality of amplifiers 13 (13-1 to 13-N, where N=3 in the present embodiment).

The fundamental frequency generator 11 obtains the vehicle speed detected by the vehicle speed sensor 5*a* and based on the obtained vehicle speed, generates a fundamental frequency of the vehicle travel sound, and feeds the generated fundamental frequency to the harmonic acoustic frequency generators 12. In the present embodiment, in four vehicle speed ranges of vehicle speed v being from 0 to v1, vehicle speed v being from v1 to v2, vehicle speed v being from v2 to v3, and vehicle speed v being v3 or above, the fundamental frequency fb is set for each range approximately to so-called Shepard infinite scale, which exponentially increases from the lower limit frequency to the upper limit frequency. Such a fundamental frequency fb is set based on the shapes and interior materials of the vehicle compartment and seats of the vehicle C as appropriate.

The harmonic acoustic frequency generators 12 each generate a harmonic acoustic frequency signal including a harmonic acoustic frequency fn from the fundamental frequency fb and feeds the generated harmonic acoustic frequency signal (cosine wave and sine wave) to a corresponding one of the amplifiers 13. The harmonic acoustic frequency generators 12-1, 12-2, 12-3 respectively define (change) the amplitudes of the components of harmonic acoustic frequencies f1, f2, f3, based on the vehicle speed by using table data stored in advance. It should be noted that the number of the harmonic acoustic frequencies is not limited to 3 and can be set to a value of 2 or more.

For example, the harmonic acoustic frequency generator 12-1, which corresponds to a harmonic order of 1, generates, when the vehicle speed v=vk, based on the fundamental frequency fb, a harmonic acoustic frequency flk related to cosine and sine waves and then generates a harmonic acoustic frequency signal Slk having a constant amplitude for each of the cosine and sine waves. The harmonic acoustic frequency generator 12-*n*, which corresponds to a harmonic order of n (n=2 to N), generates, when the vehicle speed v=vk, a harmonic acoustic frequency fnk related to cosine and sine waves by multiplying the cosine and sine wave harmonic acoustic frequency flk by $A^{n-1}$ and then generates a harmonic acoustic frequency signal Snk having a constant amplitude for each of the cosine and sine waves. Here, A is a positive integer, a specific example of which is 2.

Figure 3:
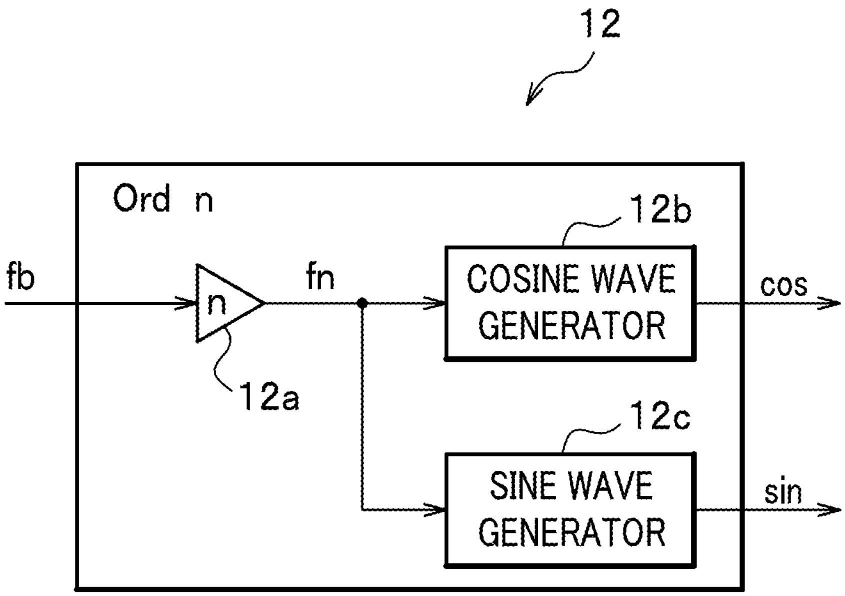
FIG. 3 is a schematic block diagram of a harmonic acoustic frequency generator according to the embodiment of the invention.

In more detail, as illustrated in FIG. 3, the harmonic acoustic frequency generators 12 each have, as functional blocks, a harmonic frequency generator 12*a*, a cosine wave generator 12*b*, and a sine wave generator 12*c*. The harmonic frequency generator 12*a* obtains the fundamental frequency fb, generates a harmonic frequency fn (fnk) of a harmonic order of n based on the obtained fundamental frequency fb, and feeds the generated result to the cosine wave generator 12*b* and the sine wave generator 12*c*. The cosine wave generator 12*b* obtains the harmonic frequency fn, generates a harmonic acoustic frequency signal Snk having a cosine wave component of the harmonic frequency fn based on the obtained harmonic frequency fn, and feeds the harmonic acoustic frequency signal Snk to the corresponding amplifier 13. The sine wave generator 12*c* obtains the harmonic frequency fn, generates a harmonic acoustic frequency signal Snk having a sine wave component of the harmonic frequency fn based on the obtained harmonic frequency fn, and feeds the harmonic acoustic frequency signal Snk to the corresponding amplifier 13. Note that it is possible to reproduce the harmonic frequency fn by combining the cosine wave component and the sine wave component.

As illustrated in FIG. 2, the amplifiers 13 each amplify (adjust the amplitude of) the respective harmonic acoustic frequency signals, and feed the amplification result (amplified cosine and sine waves) to the respective sound field controller 20. The amplifier 13 amplifies the cosine wave related harmonic acoustic frequency signal and the sine wave related harmonic acoustic frequency signal each with the same gain value. The gain value is set as appropriate. The amplification of the harmonic acoustic frequency signal by the amplifier 13 includes cases where the amplified amplitude is smaller than the amplitude before amplification.

Sound Field Controller

The sound field controllers 20 each obtains the respective (amplified) harmonic acoustic frequency signals from the periodic waveform generator 10 and adjusts the amplitude and phase of the obtained harmonic acoustic frequency signals using a Single-Frequency Adaptive Notch (SAN) filter. The SAN filter is a filter for adjusting the amplitude and phase of a periodic sound. The SAN filter is capable of generating a desired sound signal with a significantly less amount of computation compared to FIR filters. The sound field controllers 20 each include filters 21, 22 and a combiner 23 for each of the speakers 6.

The filter 21 adjusts (the amplitude of) the cosine wave of the amplified harmonic acoustic frequency signal according to an SAN filter coefficient Wr set to the filter 21 and outputs the result of the adjustment to the combiner 23. The filter 22 adjusts (the amplitude of) the sine wave of the amplified harmonic acoustic frequency signal according to an SAN filter coefficient Wi set to the filter 22 and outputs the result of the adjustment to the combiner 23. The combiner 23 combines the results of the adjustments by the filters 21, 22 to generate a combined result and outputs the combined result to the corresponding sound combiner 30.

The coefficients Wr, Wi are values to be multiplied to the amplitudes of the signals to be combined. The coefficients Wr, Wi are set for the corresponding speaker 6. For example, the filters 21,22 corresponding to the m-th speaker 6-*m* adjusts (the amplitude of) the harmonic acoustic frequency signals fed from the periodic waveform generator 10 using the coefficients Wrm, Wim (m=1, M, where M=6 in the present embodiment).

The coefficients Wr, Wi are set so that a travel sound effect is audible in the listening area 2 as a result of superposition of the sounds generated by the plurality of speakers 6 and so that the travel sound effect is inaudible in the quiet area 3 because the sounds generated by the plurality of speakers 6 are superposed to be canceled. The method for determining such coefficients Wr, Wi is described in detail below.

Sound Combiner

The sound combiners 30 each combine the sound signals generated by the plurality of sound field controllers 20 for the corresponding speaker 6 to generate a combined result and feeds the combined result to a corresponding output adjuster 40.

Output Adjuster

Based on at least one of the detection results of the vehicle speed sensor 5*a*, acceleration sensor 5*b*, and accelerator opening degree sensor 5*c* (i.e., at least one of the vehicle speed, acceleration, and opening degree of the accelerator pedal, of the vehicle C), the output adjusters 40 each adjust (the amplitude of) the sound signal combined by the corresponding sound combiner 30, and outputs the adjusted result to the corresponding speaker 6.

In the case of the present embodiment, the output adjusters 40 each determine a coefficient related to the vehicle speed, a coefficient related to the acceleration, and a coefficient related to the opening degree of the accelerator pedal, based on the detection results of the sensors 5*a*, 5*b*, and 5*c*, and, based on the determined coefficients, computes a coefficient for adjusting (amplifying) the amplitude.

Figure 4:
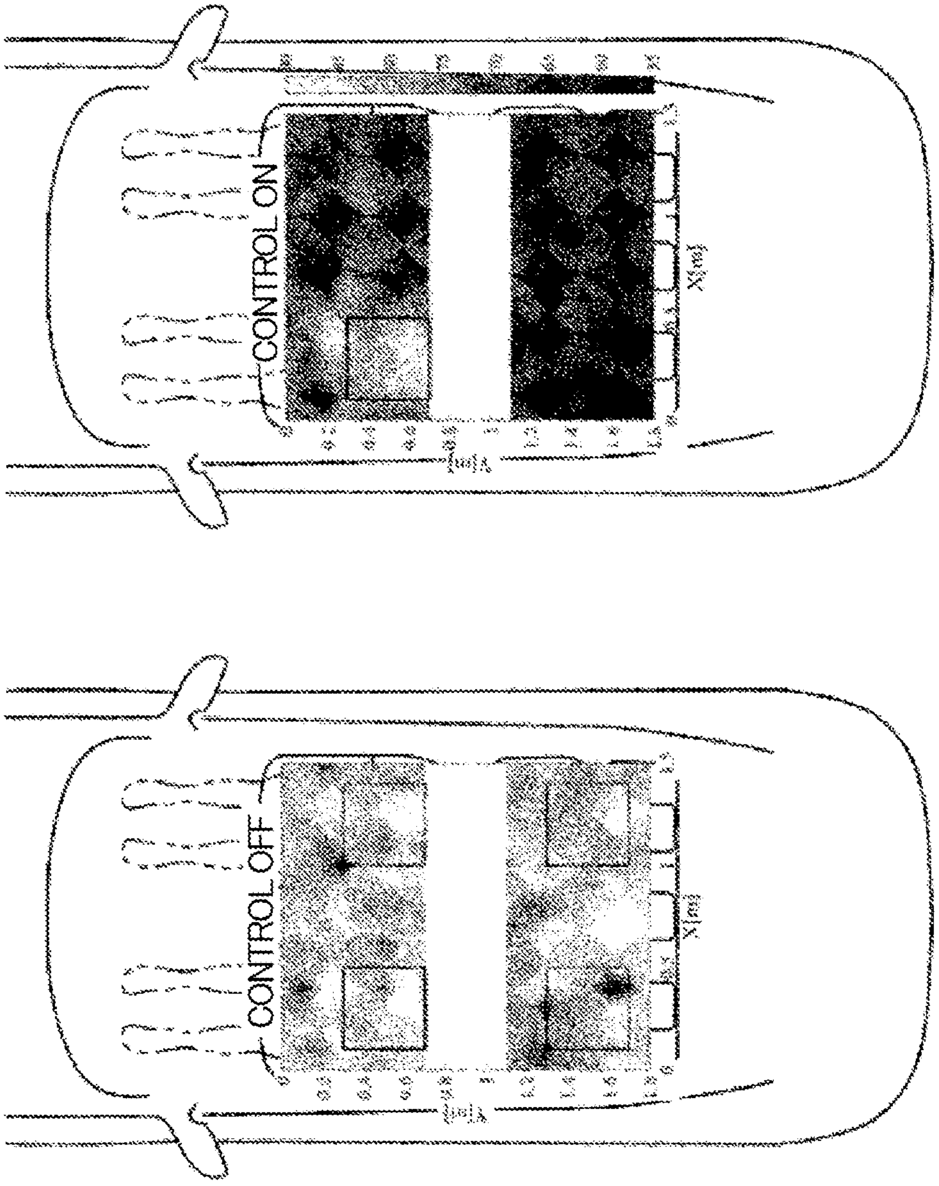
FIG. 4 is a schematic diagram of an example of a listening area and a quiet area produced by the sound field control system according to the embodiment of the invention.

As shown in left part of FIG. 4, the sound field control device 7 may, in a state in which control is turned off, generate a sound that is audible in the entire space of the vehicle compartment. As shown in right part of FIG. 4, the sound field control device 7 may, in a state in which control is turned on, generate sounds, i.e., a travel sound effect, that produces a listening area 2 (less densely hatched area)(see FIG. 1) in the vicinity of the driver's seat and a quiet area 3 (more densely hatched area)(see FIG. 1) in the vicinities of the other seats in the vehicle compartment. In FIG. 4, the less densely hatched areas each represent an area where sound is audible (a high decibel area); and the more densely hatched areas each represent an area where sound is inaudible (a low decibel area).

The sounds generated from the plurality of speakers 6 by the sound field control device 7 are superposed in the listening area 2 to be audible to the occupant (driver) as a vehicle travel sound based on (at least one of) the vehicle speed, acceleration, and accelerator pedal opening degree. The sounds generated from the plurality of speakers 6 by the sound field control device 7 are superposed to be canceled in the quiet area 3, so that they are inaudible to the occupants (occupants other than the driver) in the quiet area 3.

The travel sound effect provided to the listening area 2 by the sound field control device 7 makes the driver feel the vehicle speed by controlling the fundamental frequency generated by the fundamental frequency generator 11 such that, for example, when the vehicle speed of the vehicle C is high, the frequency is set high and the sound energy is set large. The travel sound effect provided to the listening area 2 by the sound field control device 7 causes the driver to perceive the feel of acceleration of the vehicle C by controlling the adjustment by the output adjusters 40 such that, for example, when the vehicle C is accelerated, the frequency is set high and the sound energy is set large.

The sound field control device 7 according to the embodiment of the present invention is a device configured to produce a listening area 2 where a travel sound effect is audible and a quiet area 3 in a sound field in the vehicle C using a plurality of speakers 6. The sound field control device 7 includes: a periodic waveform generator 10 configured to generate different phase two periodic waveforms related to the travel sound effect based on the vehicle speed, and a sound field controller 20 configured to, for each of the plurality of speakers 6, individually amplify and combine the different phase two periodic waveforms to generate a combined result using an SAN filter having coefficients, the coefficients being set with respect to the speaker 6 based on locations of the listening area 2 and the quiet area 3, and feed the combined result to the speaker 6.

The sound field control device 7 produces the listening area 2 and the quiet area 3 by adjusting the different phase two periodic waveforms by the SAN filter. As a result, the sound field control device 7 can produce the listening area 2 where travel sound effect is audible and the quiet area 3 with a small amount of computation and thus reduce the cost, which contributes to evolving sustainable conveyance system.

The periodic waveform generator 10 of the sound field control device 7 is configured to generate a plurality of sets of different phase two periodic waveforms, including the different phase two periodic waveforms, each for a frequency. The sound field controller 20 of the sound field control device 7 is further configured to, for each of the plurality of speakers 6, individually amplify and combine each of the plurality of sets of different phase two periodic waveforms to generate a frequency specific combined result using a respective SAN filter having coefficients, the coefficients being set with respect to the speaker 6 based on the locations of the listening area 2 and the quiet area 3 and set with respect to the frequency of the different phase two periodic waveforms, and feed the frequency specific combined result to the speaker 6. The sound field control device 7 further includes, for each of the plurality of speakers 6, a sound combiner 30 configured to further combine the frequency specific combined results combined for the speaker 6 to generate a speaker specific combined result and output the speaker specific combined result to the speaker 6.

With this configuration, the sound field control device 7 performs control using an SAN filter for each frequency band, which makes it possible to produce the listening area 2 and the quiet area 3 with a small amount of computation compared to a case in which an FIR filter is used and thus lower the cost and makes it possible to produce the listening area 2 and the quiet area 3 in a suitable manner.

The sound field control device 7 further includes, for each of the plurality of speakers 6, an output adjuster 40 configured to, based on at least one of the vehicle speed, acceleration, and accelerator opening degree of the vehicle C, adjust the amplitude of the speaker specific combined result to generate an adjusted result and output the adjusted result to the speaker 6.

As a result, the sound field control device 7 can produce a travel sound effect according to the travel state (feel of acceleration) of the vehicle C.

Filter Determination System

Figure 5:
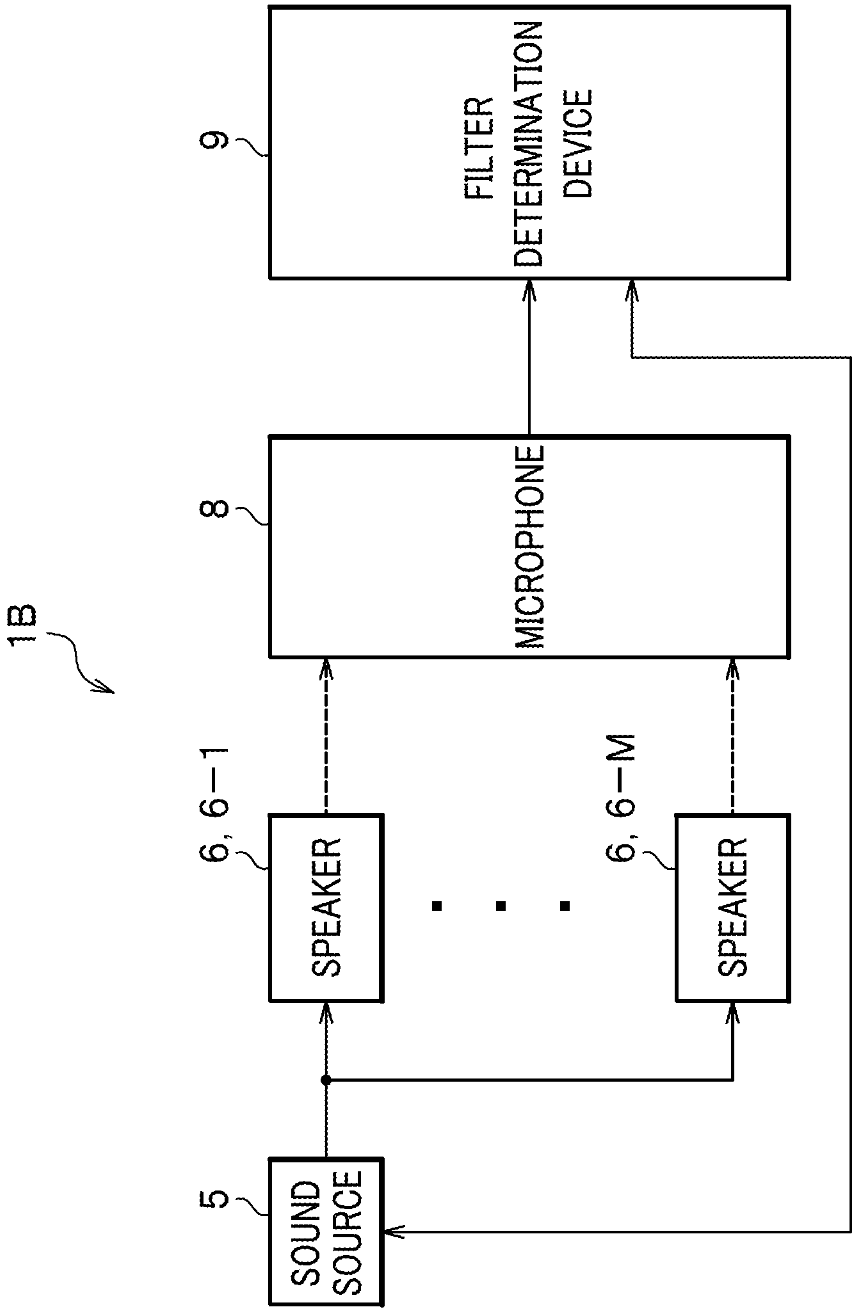
FIG. 5 is a schematic block diagram of the filter determination system according to the embodiment of the invention.

Subsequently, a description will be given of a system for determining the coefficients (Wrm, Wim) of the SAN filters of the sound field controllers 20 of the sound field control device 7. As illustrated in FIG. 5, a filter determination system 1B according to the embodiment of the present invention includes: a sound source 5; a plurality of speakers 6 (6-1 to 6-M, where M=6 in the present embodiment); at least one microphone 8; and a filter determination device 9.

Sound Source, Speaker, and Microphone

In the present embodiment, the sound source 5 feeds a sound signal of the frequency band of each control-target component (control frequency) for which filter coefficients are to be determined to a corresponding one of the speakers 6. The speakers 6 each generate a sound based on the sound signal fed from the sound source 5. The at least one microphone 8 is used to pick up, at positions (grid points allocated in the form of a grid dividing the sound field) defined in the vehicle compartment (sound field) of the vehicle C, the sound of each control frequency generated by the speakers 6 and feeds the result of picking up the sound to the filter determination device 9.

The at least one microphone 8 may be configured such that at least one microphone is moved by an operator or a computer-controlled arm to each grid point to pick up the sound thereof. Alternatively, the at least one microphone 8 may be configured such that as many microphones as the number of the grid points are disposed at the grid points to pick up the sounds at the same time.

Filter Determination Device

The filter determination device 9 is constructed of a Central Processing Unit (CPU), a Read-Only Memory (ROM), a Random Access Memory (RAM), an input-output circuitry, and the like. The filter determination device 9 determines the coefficients Wr, Wi (Wrm, Wim) of the filters (SAN filters) used in the sound field controllers 20 of the sound field control device 7, based on the result of picking up the sounds by the at least one microphone 8.

The filter determination device 9 controls the sound source 5 to cause each of the plurality of speakers to generate a sound for generating a sound field characteristic matrix G and, based on the result of picking up the sound by the microphone 8 arranged at each of the sound field grid points, generate the sound field characteristic matrix G, which contains sound field characteristics $G_{y,x}$ of all the sound field grid points (see Equation (1) below).

$$G = \begin{bmatrix} G_{1,1} & \cdots & G_{1,X} \\ \vdots & \ddots & \vdots \\ G_{Y,1} & \cdots & G_{Y,X} \end{bmatrix} \tag{1}$$

In Equation (1), Y corresponds to the number of the grid points and X corresponds to the number of the speakers 6 (X=M=6 in this embodiment).

The sound field characteristics $G_{y,x}$, which is the elements of the sound field characteristic matrix G, are each a transfer function of a sound generated by a speaker 6-*x* to a microphone 8 located at a grid point y in the sound field. The filter determination device 9 calculates sound field characteristics (transfer function including a gain and a phase) $G_{y,x}$ based on the sounds to be generated by the speakers 6 and the sounds picked up by the microphone 8.

The filter determination device 9 generates matrices $G_V$ and $G_Q$ for the listening area 2 and the quiet area 3 based on the sound field characteristic matrix G. The matrix $G_V$ relates to the sound field characteristic (transfer function) of the listening area 2. The matrix $G_V$ contains, of the elements of the sound field characteristic matrix G, the sound field characteristics (transfer functions) of the grid points corresponding to the listening area 2 (in other words, contains zeros as the sound field characteristics of the grid points corresponding to the quiet area 3). The matrix $G_Q$ relates to the sound field characteristic (transfer function) of the quiet area 3. The matrix $G_Q$ contains, of the elements of the sound field characteristic matrix G, the sound field characteristics (transfer functions) of the grid points corresponding to the quiet area 3 (in other words, contains zeros as the sound field characteristics of the grid points corresponding to the listening area 2).

The filter determination device 9 determines the coefficients Wr, Wi (Wrm, Wim) of the filters (SAN filters) used in the sound field controllers 20 so as to maximize (sound energy in the listening area 2)/(sound energy in the quiet area 3). Here, the sound energy $E_V$ in the listening area 2 and the sound energy $E_Q$ in the quiet area 3 are respectively represented by Equations (2) and (3) below.

$$E_V \propto \sum_{u=1}^{YX} p_{Vu}^2 = W^H G_V^H G_V W \tag{2}$$

$$E_Q \propto \sum_{u=1}^{YX} p_{Qu}^2 = W^H G_Q^H G_Q W \tag{3}$$

Here, $p_{V,u}$ represents the sound pressure at a grid point position u in the listening area 2. $p_{Q,u}$ represents the sound pressure at a grid point position u in the quiet area 3.

The filter determination device 9 calculates control characteristic W so as to maximize an evaluation function $J=E_V/E_Q$. The control characteristic W is an eigen vector corresponding to the maximum eigne values of the matrix $G^H{}_V G_V[G^H{}_Q G_Q]^{-1}$. The control characteristic W represent characteristics in the form of complex numbers and are given as Equation (4) below.

$$W=Wr+i\cdot Wi \tag{4}$$

Specifically, the real parts Wr (Wrm) of the control characteristic W are the coefficients to be applied to the cosine wave components generated by the cosine wave generators 12*b* of the harmonic acoustic frequency generators 12; and the imaginary parts Wi (Wim) of the control characteristic W are the coefficients to be applied to the sine wave components generated by the sine wave generators 12*c* of the harmonic acoustic frequency generators 12. The filter determination device 9 calculates such control characteristic Wr, Wi (Wrm, Wim) for each of the speakers 6.

The filter determination device 9 determines, for the listening area 2 and the quiet area 3 which is the counterpart of the listening area 2, the coefficients Wr, Wi (Wrm, Wim) for each frequency f (angular frequency ω), i.e., a harmonic frequency in the present embodiment. The filter determination device 9 generates a table that associates the frequencies f (harmonic frequencies in the present embodiment) and the coefficients Wr, Wi (Wrm, Wim), and store the table in a memory (see FIG. 6). Note that the values of the coefficients Wr, Wi (Wrm, Wim) are not limited to those specified in the table illustrated in FIG. 6.

The sound field controllers 20 of the sound field control device 7 adjust the control target components using the coefficients Wr, Wi (Wrm, Wim) for the listening area 2. The sound field controllers 20 may be configured to store the coefficients wr, wi (wrm, wim) for each frequency f (angular frequency ω) related to the listening area 2 in the form of a table and retrieve and use the coefficients wr, wi (wrm, wim).

A filter determination system 1B according to an embodiment of the present invention is a system for setting the coefficients of the SAN filters of the sound field control device 7. The filter determination system 1B includes: at least one microphone 8 used to pick up sounds generated by the plurality of speakers 6, at a plurality of positions in the sound field; and a filter determination device 9 configured to determine the coefficients of the SAN filter based on the result of picking up the sounds by the at least one microphone 8 so as to, regarding the listening area 2 set in the sound field and the quiet area 3 set in the sound field, maximize a value obtained by dividing a value of sound energy in the listening area 2 by a value of sound energy in the quiet area 3.

With this configuration, the filter determination system 1B determines suitable coefficients for the SAN filter for producing the listening area 2 where travel sound effect is audible and the quiet area 3 in the sound field.

The filter determination device 9 of the filter determination system 1B determines, for each of the frequencies of the plurality of sets of different phase two periodic waveforms, the coefficients of the SAN filter so as to maximize a value obtained by dividing a value of sound energy in the listening area 2 by a value of sound energy in the quiet area 3.

With this configuration, the filter determination system 1B determines suitable coefficients for the filter for producing the listening area 2 and the quiet area 3 in the sound field for each frequency band.

The filter determination device 9 of the filter determination system 1B generates a table in which the frequencies of the plurality of sets of two periodic waveforms are associated with the coefficients.

The filter determination system 1B provides filter coefficients in a form suitable to the sound field control device 7.

Although an embodiment of the present invention has been described above, it is to be understood that the present invention is not limited only to the above-described embodiment and the embodiment can be modified as appropriate within the range not departing from the gist of the invention.

What is claimed is:

1. A sound field control device configured to produce a listening area where a travel sound effect is audible and a quiet area in a sound field in a vehicle using a plurality of speakers, the sound field control device comprising:

a periodic waveform generator configured to generate different phase two periodic waveforms related to the travel sound effect based on a vehicle speed; and a sound field controller configured to, for each of the plurality of speakers, individually amplify and combine the different phase two periodic waveforms to generate a combined result using a Single-frequency Adaptive Notch (SAN) filter having coefficients, the coefficients being set with respect to the speaker based on locations of the listening area and the quiet area, and feed the combined result to the speaker.

2. The sound field control device according to claim 1, wherein the periodic waveform generator is further configured to generate a plurality of sets of different phase two periodic waveforms, including the different phase two periodic waveforms, the plurality of sets of different phase two periodic waveforms having different frequencies than one another, wherein the sound field controller is further configured to, for each of the plurality of speakers, individually amplify and combine each of the plurality of sets of different phase two periodic waveforms to generate a frequency specific combined result using a respective SAN filter having coefficients, the coefficients being set with respect to the speaker based on the locations of the listening area and the quiet area and set with respect to the frequency of the different phase two periodic waveforms, and feed the frequency specific combined result to the speaker, wherein the sound field control device further comprises, for each of the plurality of speakers, a sound combiner configured to further combine the frequency specific combined results combined for the speaker to generate a speaker specific combined result and output the speaker specific combined result to the speaker.

3. The sound field control device according to claim 1, further comprising, for each of the plurality of speakers, an output adjuster configured to, based on at least one of a vehicle speed, an acceleration, and an accelerator opening degree of the vehicle, adjust an amplitude of the combined result to generate an adjusted result and output the adjusted result to the speaker.

4. The sound field control device according to claim 2, further comprising, for each of the plurality of speakers, an output adjuster configured to, based on at least one of a vehicle speed, an acceleration, and an accelerator opening degree of the vehicle, adjust an amplitude of the speaker specific combined result to generate an adjusted result and output the adjusted result to the speaker.

5. A filter determination system for setting the coefficients of the SAN filter of the sound field control device according to claim 1, the filter determination system comprising:

at least one microphone used to pick up sounds generated by the plurality of speakers, at a plurality of positions in the sound field; and a filter determination device configured to determine the coefficients of the SAN filter based on a result of picking up the sounds by the at least one microphone so as to maximize a value obtained by dividing a value of sound energy in the listening area by a value of sound energy in the quiet area.

6. A filter determination system for setting the coefficients of the SAN filters of the sound field control device according to claim 2, the filter determination system comprising:

at least one microphone used to pick up sounds generated by the plurality of speakers, at a plurality of positions in the sound field; and a filter determination device configured to determine, for each of the frequencies of the plurality of sets of different phase two periodic waveforms, the coefficients of the corresponding SAN filters based on a result of picking up the sounds by the at least one microphone so as to maximize a value obtained by dividing a value of sound energy in the listening area by a value of sound energy in the quiet area.

7. The filter determination system according to claim 6, wherein the filter determination device is further configured to generate a table that associates the frequencies of the plurality of sets of different phase two periodic waveforms with the coefficients of the SAN filters.

8. The sound field control device according to claim 1, wherein the coefficients of the SAN filter have been determined such that a sound resulting in superposing sounds generated by the plurality of speakers in the listening area is audible and a sound resulting in superposing sounds generated by the plurality of speakers in the quiet area is inaudible due to cancellation thereof, each of the sounds generated by the plurality of speakers being a sound output from a respective one of the plurality of speakers based on the combined result generated by combining the different phase two periodic waveforms for the speaker.

9. The sound field control device according to claim 1, wherein the coefficients of the SAN filter have been determined so as to maximize a value obtained by dividing a value of sound energy in the listening area by a value of sound energy in the quiet area.

* * * * *